United States Patent
Otsuka (10) Patent No.: US 7,033,071 B2
(45) Date of Patent: Apr. 25, 2006

(54) METHOD AND APPARATUS FOR CORRECTING SENSOR SIGNAL IN TEMPERATURE

(75) Inventor: Yuzuru Otsuka, Kariya (JP)

(73) Assignee: Denso Corporation, Kariya-city (JP)

( * ) Notice: Subject to any disclaimer, the term of this patent is extended or adjusted under 35 U.S.C. 154(b) by 40 days.

(21) Appl. No.: 10/803,099

(22) Filed: Mar. 18, 2004

(65) Prior Publication Data
US 2004/0208225 A1   Oct. 21, 2004

(30) Foreign Application Priority Data
Mar. 18, 2003   (JP)   ................ 2003-73899

(51) Int. Cl.
  *G01K 13/00*   (2006.01)
  *G01K 7/00*    (2006.01)
  *G01P 3/00*    (2006.01)
(52) U.S. Cl. .................. 374/142; 374/172; 73/497
(58) Field of Classification Search ............. 374/1, 374/183, 172, 173, 142, 152; 73/497, 488
See application file for complete search history.

(56) References Cited

U.S. PATENT DOCUMENTS

| | | | | |
|---|---|---|---|---|
| 3,782,205 A | * | 1/1974 | Fletcher et al. ........ | 73/497 |
| 4,144,769 A | * | 3/1979 | Mayer .................. | 73/497 |
| 4,467,651 A | * | 8/1984 | Peters et al. .......... | 73/497 |
| 5,297,028 A | * | 3/1994 | Ishikawa .............. | 73/497 |
| 5,806,364 A | | 9/1998 | Kato et al. | |
| 6,220,094 B1 | * | 4/2001 | Ichinose et al. ...... | 73/504.16 |

FOREIGN PATENT DOCUMENTS

| | | | | |
|---|---|---|---|---|
| JP | 61221613 A | * | 10/1986 |
| JP | 01041865 A | * | 2/1989 |
| JP | 06148231 A | * | 5/1994 |
| JP | 6-160100 | | 6/1994 |
| JP | 06265565 A | * | 9/1994 |
| JP | 9-170927 | | 6/1997 |

* cited by examiner

*Primary Examiner*—Diego Gutierrez
*Assistant Examiner*—Mirellys Jagan
(74) *Attorney, Agent, or Firm*—Posz Law Group, PLC (57) ABSTRACT

A slope correction signal setting unit is configured to output selectively one of a plurality of direct current signals according to the sensed temperature parameter signal. Levels of the plurality of direct current signals are determined to correspond to the predetermined temperature dependent characteristic of the sensor signal. An analog amplifying circuit is connected to the slope correction signal setting unit and configured to amplify the outputted direct current signal according to the sensed temperature parameter signal. An analog arithmetic circuit is connected to the analog amplifying circuit and configured to carry out a predetermined arithmetic operation based on the amplified direct current signal and the sensor signal.

13 Claims, 7 Drawing Sheets

METHOD AND APPARATUS FOR CORRECTING SENSOR SIGNAL IN TEMPERATURE

BACKGROUND OF THE INVENTION

The present invention relates to a method and an apparatus for carrying out zero point corrections of temperature dependent characteristics of output signal signals of sensors.

Various types of sensors have their varying temperature dependent characteristics due to environmental temperatures therearound and piece-to-piece variations. Such a sensor has complex temperature dependent factors so that the temperature dependent characteristic of the sensor is usually different from a simple linear characteristic.

In order to correct the temperature dependent characteristic of the sensor, the environmental temperature around the sensor is measured as a temperature parameter signal, and the absolute level of the sensor signal outputted from the sensor, which includes an error depending on the environmental temperature, is corrected based on the measured temperature parameter signal. This results in that the slope of the sensor signal with respect to the environmental temperature is simple linearly corrected.

This absolute correction, however, fails to accurately correct the zero point correction, in other words, offset correction, of the temperature dependent characteristic of the sensor.

Then, as an example of the zero point correction of a temperature dependent characteristic of a sensor, a signal processing circuit that carries out the zero point correction of a temperature dependent characteristic of an oscillation gyro (a yaw rate sensor) is disclosed in Japanese Patent Publication H6-160100.

Figure 7:
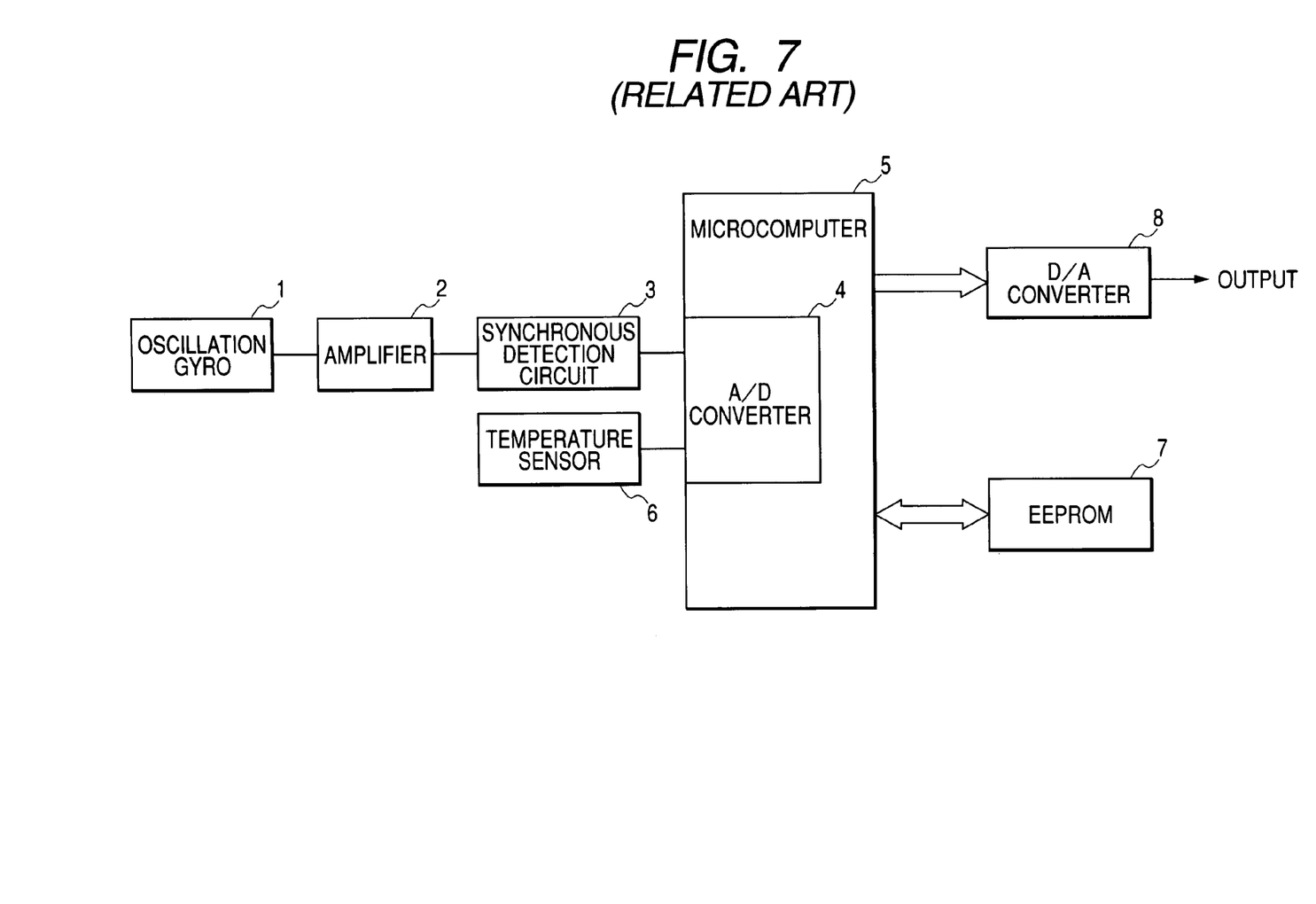
FIG. 7 is a circuit diagram illustrating a conventional sensor signal correction apparatus.

FIG. 7 illustrates the schematic structure of the disclosed signal processing circuit. In the signal processing circuit, a yaw rate signal obtained by an oscillation gyro 1 is amplified by an amplifier 2, and the amplified signal is synchronously detected by a synchronous detection circuit 3. The synchronous detected signal is quantized (digitized) by an analog-to-digital (A/D) converter 4 as digital data, and the digital data is smoothed by a microcomputer 5.

On the other hand, an environmental temperature around the oscillation gyro 1 is detected by a temperature sensor 6, and a temperature parameter signal based on the detected environmental temperature is inputted to the microcomputer 5 as temperature data.

The microcomputer 5 corrects the smoothed digital data based on the temperature data to obtain temperature characteristic data, storing the obtained temperature characteristic data on an EEPROM (Electrically Erasable and Programmable Memory) 7.

When measuring a yaw rate of an object by the oscillation gyro 1, the smoothed digital data corresponding to the yaw rate of the object detected by the oscillation gyro 1 is inputted to the microcomputer 5 through the amplifier 2, the synchronous detection circuit 3, and the A/D converter 4.

The microcomputer 5 reads out the temperature characteristic data from the EEPROM 7 to carry out the zero point correction of the digital data based on the read-out temperature characteristic data. A digital-to-analog converter (D/A) converter 8 converts the zero-point corrected digital data into analog data to output the analog data as the zero-point corrected yaw rate of the object. The above signal processing allows the zero point correction to be effectively executed.

The disclosed signal processing circuit, however, requires the microcomputer 5 for performing the zero point correction, causing the cost of the signal processing circuit to rise.

In addition, the disclosed signal processing circuit requires the A/D converter 4 for converting the yaw rate signal into the digital data, and the D/A converter 5 for converting the zero-point corrected digital data into the analog data corresponding to the zero-point corrected yaw rate of the object.

The analog-to-digital conversion processing (quantization processing) of the yaw rate signal itself, and the digital-to-analog conversion processing of the zero-point corrected digital data may increase the total processing time of the zero point correction processing, and, especially, quantization errors may be included in the zero-point corrected yaw rate of the object.

SUMMARY OF THE INVENTION

The present invention is made on the background.

Accordingly, it is an object of the present invention to provide a method and an apparatus for correcting a sensor signal in an environmental temperature, which are capable of decreasing a total processing time of the correction of the sensor output signal in the environmental temperature.

According to one aspect of the present invention, there is provided an apparatus for sensing an environmental temperature around a sensor as a temperature parameter signal and correcting a sensor signal outputted from the sensor based on the temperature parameter signal, the temperature parameter signal depending on the environmental temperature, the sensor signal having a predetermined temperature dependent characteristic that depends on the environmental temperature, the apparatus comprising: a slope correction signal setting unit configured to output selectively one of a plurality of direct current signals according to the sensed temperature parameter signal, levels of the plurality of direct current signals being determined to correspond to the predetermined temperature dependent characteristic of the sensor signal; an analog amplifying circuit connected to the slope correction signal setting unit and configured to amplify the outputted direct current signal according to the sensed temperature parameter signal; and an analog arithmetic circuit connected to the analog amplifying circuit and configured to carry out a predetermined arithmetic operation based on the amplified direct current signal and the sensor signal.

According to another aspect of the present invention, there is provided an apparatus for sensing an environmental temperature around a yaw rate sensor as a temperature parameter signal and correcting a sensor signal outputted from the yaw rate sensor based on the temperature parameter signal, the temperature parameter signal depending on the environmental temperature, the sensor signal having a predetermined temperature dependent characteristic that depends on the environmental temperature, the apparatus comprising: a slope correction signal setting unit configured to output selectively one of a plurality of direct current signals according to the sensed temperature parameter signal, levels of the plurality of direct current signals being determined to correspond to the predetermined temperature dependent characteristic of the sensor signal; an analog amplifying circuit connected to the slope correction signal setting unit and configured to amplify the outputted direct current signal according to the sensed temperature parameter signal; and an analog arithmetic circuit connected to the analog amplifying circuit and configured to carry out a predetermined arithmetic operation based on the amplified direct current signal and the sensor signal.

According to further aspect of the present invention, there is provided a method of correcting a sensor signal outputted from a sensor, the method comprising: sensing an environmental temperature around the sensor as a temperature parameter signal, the temperature parameter signal depending on the environmental temperature, the sensor signal having a predetermined temperature dependent characteristic that depends on the environmental temperature; outputting selectively one of a plurality of direct current signals according to the sensed temperature parameter signal, levels of the plurality of direct current signals being determined to correspond to the predetermined temperature dependent characteristic of the sensor signal; amplifying the outputted direct current signal according to the sensed temperature parameter signal; and carrying out a predetermined arithmetic operation based on the amplified direct current signal and the sensor signal.

BRIEF DESCRIPTION OF THE DRAWINGS

Other objects and aspects of the invention will become apparent from the following description of an embodiment with reference to the accompanying drawings in which.

DETAILED DESCRIPTION OF EMBODIMENTS OF THE INVENTION

Embodiments of the invention will be described hereinafter with reference to the accompanying drawings.
(First Embodiment)

As a first embodiment of the present invention, a sensor signal correcting apparatus for a yaw rate sensor installed in a vehicle, for which the present invention is applied, will be described hereinafter with reference to FIGS. 1 and 2.

Figure 1:
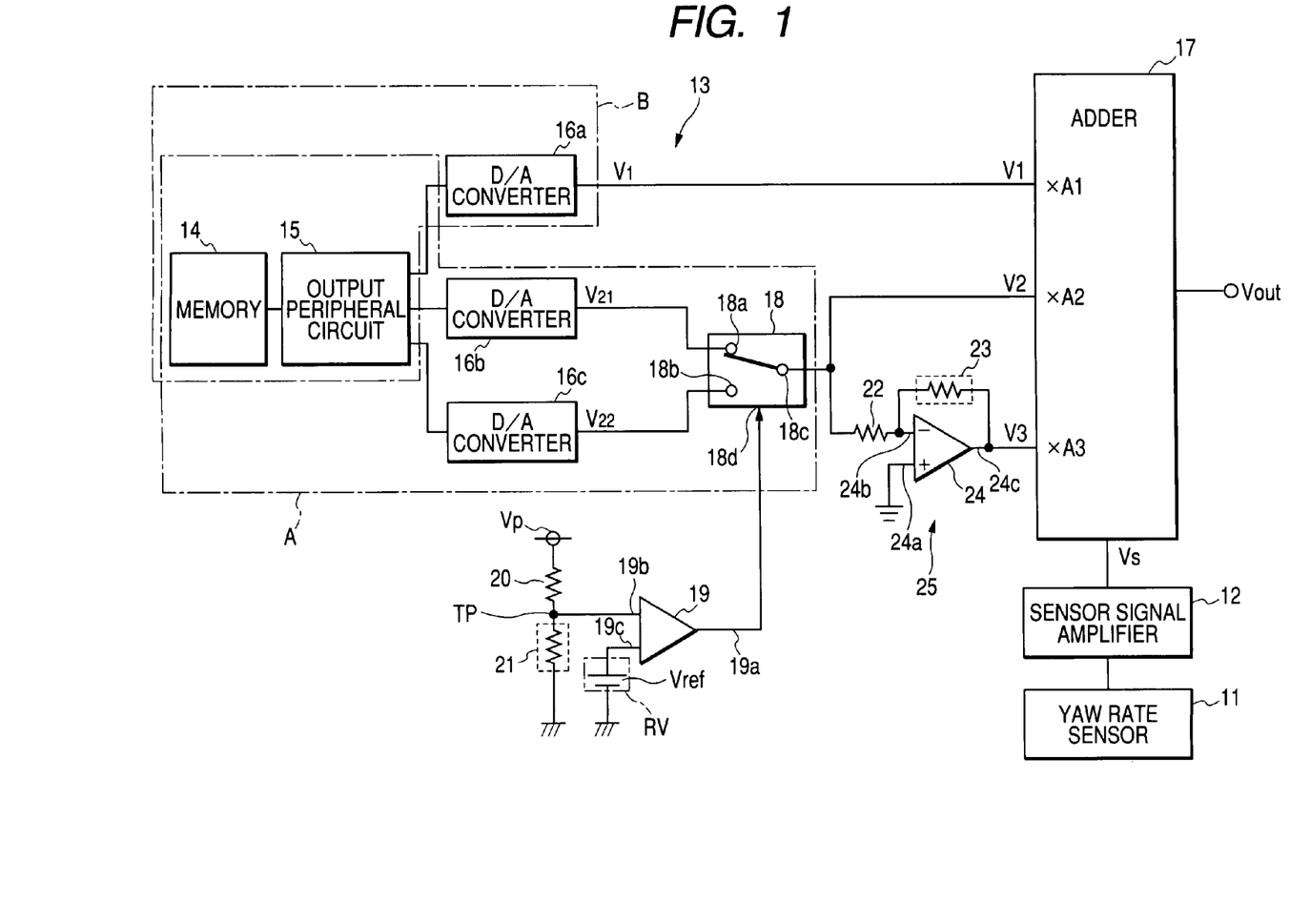
FIG. 1 is a block diagram schematically illustrating a yaw rate sensor, a sensor signal amplifier, and a sensor signal correcting apparatus according to a first embodiment of the present invention.

FIG. 1 is a block diagram schematically illustrating the yaw rate sensor 11, a sensor signal amplifier 12, and the sensor signal correcting apparatus 13 according to the first embodiment.

The yaw rate sensor 11 installed in the vehicle, as an example of dynamic volume sensors, is composed of an oscillation member made of, for example, piezoelectric element (not shown), such as PZT (lead (Pb) zirconia (Zr) titanate (Ti)) ceramic so that the piezoelectric element is formed as, for example a fork-like shape. The yaw rate sensor 11 is designed, as well known, to use Coriolis force to sense a yaw rate of the vehicle. In particular, the yaw rate sensor 11 is provided in the vehicle in order to keep the vehicle's running condition stable. Concretely, the yaw rate sensor 11 is provided in the vehicle for sensing the drift of the vehicle in order to control the state of the brake or to control the steering angle of the front wheels or the rear wheels.

The yaw rate sensor 11 is configured to sense a current and/or a voltage caused in its oscillation member, which corresponds to a yaw rate of the vehicle, to output the sensed current and/or voltage as a sensor signal (yaw-rate signal).

The sensor signal amplifier 12 is electrically connected to the yaw rate sensor 11, and configured to amplify the sensor signal outputted from the yaw rate sensor 11.

Note that the sensor signal outputted from the yaw rate sensor 11 contains an offset component with respect to zero point depending on an environmental temperature change around the yaw rate sensor 11, which causes a problem.

This offset problem requires that a zero point correction of the sensor signal based on the environmental temperature change. In order to carry out the zero point correction, the sensor signal correcting apparatus 13 is electrically connected through the sensor signal amplifier 12 to the yaw rate sensor 11.

The sensor signal correcting apparatus 13 incorporates a memory 14, an output peripheral circuit 15 electrically connected to the memory 14, and digital-to-analog (D/A) converters 16a–16c electrically connected to the output peripheral circuit 15. The output peripheral circuit 15 is configured to output data stored on the memory 14 through the D/A converters 16a–16c as analog DC (direct current) voltages.

In addition, the sensor signal correcting apparatus 13 is composed of an analog adder 17 served as an analog arithmetic circuit and electrically connected to the sensor signal amplifier 12 and the D/A converter 16a.

The memory 14, for example, consists of a read only memory (ROM) with the storage capacity 30 to 100 bits, desirably 30 bits. On the memory 14, absolute correction data, first slope correction data, and second slope correction data with respect to the temperature dependent characteristic of the yaw rate signal are previously stored, which contents will be described hereinafter.

The output peripheral circuit 15 is a small-scale circuit configured to read out the absolute correction data, the first slope correction data, and the second slope correction data to output them as 10 bits per correction data to the D/A converters 16*a*, 16*b*, and 16*c*, respectively.

Each of the D/A converters 16*a*, 16*b*, and 16*c* has approximately a few to a few dozens bits of resolution, for example, 10 bits of resolution. That is, the D/A converter 16*a* converts the 10 bits digital data corresponding to the absolute correction data and outputted from the output peripheral circuit 15 into the analog DC signal voltageV1 to output it to the analog adder 17.

Similarly, the D/A converter 16*b* converts the 10 bits digital data corresponding to the first slope correction data and outputted from the output peripheral circuit 15 into the analog DC signal voltageV21 to output it. Furthermore, the D/A converter 16*c* converts the 10 bits digital data corresponding to the second slope correction data and outputted from the output peripheral circuit 15 into the analog DC signal voltageV22 to output it.

In addition, the sensor signal correcting apparatus 13 is composed of a switch 18 that consists of a usual multiple-input single-output switch. That is, the switch 18 is provides with a pair of fixed contacts 18*a* and 18*b*, a movable contact 18*c* that is alternately contactable with each of the fixed contacts 18*a* and 18*b*, and a selection terminal 18*d*.

To the fixed contact 18*a*, the analog DC signal voltageV21 is supplied, and to the fixed contact 18*b*, the analog DC signal voltageV22 is supplied.

That is, the switch 18 is configured to selectively switch the connection of the movable contact 18*c* to one of the fixed contacts 18*a* and 18*b* in response to a selection signal inputted to the selection terminal 18*d*, which is a high voltage signal or a low voltage signal whose level is lower than that of the high voltage signal. The connection of the movable contact 18*c* with the fixed contact 18*a* allows the analog DC signal voltageV21 to be outputted through the movable contact 18*c*.

On the other hand, the connection of the movable contact 18*c* with the fixed contact 18*b* allows the analog DC signal voltageV22 to be outputted through the movable contact 18*c*.

Incidentally, in this first embodiment, the memory 14, the output peripheral circuit 15, the D/A converters 16*b* and 16*c*, and the switch 18 are identical to a slope correction signal setting unit A related to the present invention. Moreover, the memory 14, the output peripheral circuit 15, and the D/A converter 16*a* are identical to an absolute correction signal generating unit B related to the present invention.

The sensor signal correcting apparatus 13 is also composed of a comparator 19 whose output terminal 19*a* is electrically connected to the selection terminal 18*d*. The comparator 19 is provided with a first input terminal 19*b* and a second input terminal 19*c*. The sensor signal correcting apparatus 13 is further composed of a resistor 20 and a temperature sensitive resistor 21 electrically connected through a tap terminal TP to the resistor 20 in series.

The first input terminal 19*b* of the comparator 19 is electrically connected to the tap terminal TP. To one end of the resistor 20 opposite to the temperature sensitive resistor side, a power supply voltage Vp is supplied.

The second input terminal 19*c* of the comparator 19 is electrically connected to a high side terminal of a reference voltage supply RV. A predetermined reference voltage Vref is applied from the reference voltage supply RV on the second input terminal 19*c* of the comparator 19.

The temperature sensitive resistor 21 is disposed in the periphery of the yaw rate sensor 11 and configured to sense an environmental temperature around the yaw rate sensor 11 as a resistance (resistance signal), which corresponds to a temperature parameter signal according to the present invention. That is, the temperature sensitive resistor 21 is a resistor whose resistance is uniquely determined by the environmental temperature T within the usable temperature range, such as −40° C. to 85° C. When the resistance of the temperature sensitive resistor 21 is assigned to Rt, the resistance Rt is represented by the following equation 1:

$$Rt = R0 + Ra \times (T-T0) \qquad \text{[Equation 1]}$$

where T0 represents a reference temperature, that is an ordinal temperature of, for example 25° C., R0 represents a resistance at the reference temperature T0, and Ra represents a constant of proportion. The equation 1 clearly shows that the resistance Rt is in proportion to the environmental temperature T.

When the environmental temperature T around the yaw rate sensor 11 varies, the resistance Rt of the temperature sensitive sensor 21 varies. The voltage V(19*b*) inputted to the first input terminal 19*b* of the comparator 19 is represented as the following equation 2:

$$V(19b) = Vp \times Rt/(R20 + Rt) \qquad \text{[Equation 2]}$$

where R20 represents the resistance of the resistor R20.

The comparator 19 is configured to compare the varying voltage V(19*b*) with the reference voltage Vref to selectively output through the output terminal 19*a* any one of the high and low voltage signals according to the compared result.

For example, when the voltage V(19*b*) is higher than the reference voltage Vref, the comparator 19 outputs through the output terminal 19*a* the high voltage signal as the selection signal. When the varying voltage V(19*b*) is lower than the reference voltage Vref, the comparator 19 outputs through the output terminal 19*a* the low voltage signal as the selection signal.

As described above, the slope correction signal setting unit A is operative to selectively output any one of the analog DC signal voltage V21 and the analog voltage V22 through the movable contact 18*c* of the switch 18 in response to the resistance Rt sensed by the temperature sensitive sensor 21.

The sensor signal correcting apparatus 13 is also composed of an inverting amplifying circuit 25 electrically connected to the analog adder 17 and the switch 18, respectively.

The inverting amplifying circuit 25 is provided with a resistor 22, a temperature sensitive resistor R23, and an operational amplifier 24.

The operational amplifier 24 has a non-inverting (positive, +) input terminal 24*a*, and an inverting (negative, −) input terminal 24*b* electrically connected to one end of the resister R22. Other end of the resistor R22 is electrically connected to the movable contact 18*c* of the switch 18. The operational amplifier 24 also has an output terminal 24*c*. The temperature sensitive resistor R23 is electrically connected to the output terminal 24*c* of the operational amplifier 24 and the negative input terminal 24*b* thereof to provide a negative feedback loop.

In addition, the movable contact 18*c* of the switch 18 is also electrically corrected to the adder 17.

That is, the analog DC signal voltage such as V21 or V22 is outputted through the switch's movable contact 18*c* as the analog DC signal voltage V2, and the analog DC signal voltage V2 is supplied both of the adder 17 and the inverting amplifying circuit 25.

The temperature sensitive resistor 23, similar to the temperature sensitive sensor 21, is disposed in the periphery of the yaw rate sensor 11 and has the above characteristic represented by the equation 1.

That is, the inverting amplifying circuit 25 is configured to amplify the analog DC signal voltage V2 supplied from the movable contact 18c by a predetermined gain in proportion to the environmental temperature T, thereby supplying the amplified analog DC signal voltage to the adder 17 as the analog DC signal voltage V3.

In particular, the analog DC signal voltage V3, which corresponds to an amplified signal of the inverting amplifying circuit 25 according to the first embodiment of the invention, is represented by the following equation 3:

$$V3 = -V2 \times Rt/(R22) \qquad \text{[Equation 3]}$$

where Rt represents the resistance of the temperature sensitive resistor 21, and R22 represents the resistance of the resistor R22.

The adder 17 is configured that at least an analog non-inverting amplifier and a inverting amplifier are combined with each other. The adder 17 has a first gain A1 corresponding to the analog DC signal voltage V1, a second gain A2 corresponding to the analog DC signal voltage V2, and a third gain A3 corresponding to the analog DC signal voltage V3. That is, the adder 17 performs at least one of integrating, adding and subtracting operations based on the supplied analog DC signal voltages V1–V3 and the yaw-rate signal outputted from the sensor signal amplifier 12 by using the first-third gains A1–A3.

On the other hand, as described above, the absolute correction data, first slope correction data, and second slope correction data, which are set with respect to the temperature dependent characteristic of the yaw rate signal are previously stored on the memory 14. The contents of absolute correction data, the first slope correction data, and the second slope correction data will be explained hereinafter.

At first, assuming that the sensor signal is a sensor output voltage Vs, the adder 17 performs the adding operation represented by the following equation 4 to obtain an output voltage Vout:

$$Vout = Vs + A1 \times V1 + A2 \times V2 + A3 \times V3 \qquad \text{[Equation 4]}$$

When substituting the equations [1] and [3] into the equation 4, the output voltage Vout is represented as the following equation 5:

$$\begin{aligned}
Vout &= Vs + A1 \times V1 + \{A2 - A3 \times Rt/R22\} \times V2 \qquad \text{[Equation 5]} \\
&= Vs + A1 \times V1 + \frac{[A2 - A3 \times \{R0 + Ra \times (T - T0)\}/R22] \times V2}{}
\end{aligned}$$

where all of the voltages Vs, and V1–V3 are based on a virtual ground potential, such as the half potential of the power supply. This equation 5 corresponds to an example of a second predetermined arithmetic operation according to the present invention.

The second and third terms of the equation 5 from which the first term of "the sensor signal Vs" is omitted represent a correction term based on the environmental temperature by the sensor signal correcting apparatus 13.

The third term of "[A2−A3×{R0+Ra×(T−T0)}/R22]×V2" of the equation 5 corresponds an example of a first predetermined arithmetic operation according to the present invention. That is, the third term of the equation 5 corresponds to a result of arithmetic operations of the analog DC signal voltage V2 outputted from the switch 18 and the analog DC signal voltage V3 outputted from the inverting amplifying circuit 25.

The equation 5 clearly shows that the output voltage Vout is proportional to the environmental temperature T, and that the proportionality constant of the output voltage Vout proportional to the environmental temperature T is determined by the third gain A3, the analog DC signal voltage V2 supplied to the adder 17 and so on.

This makes clear that adjustment of the third gain A3 and/or the analog DC signal voltage allows the proportionality constant to be adjusted. For example, adjustment of the sign (positive or negative) and the absolute level of the third gain A3 allow the proportionality constant to be adjusted. Consequently, adjustment of the proportionality constant of the output voltage Vout allows the yaw-rate signal to be corrected based on the environmental temperature T.

In addition, the second term of "A1×V1" of the equation 5 represents a correction term of the absolute value of the output voltage Vout so that adjustment of the analog DC signal voltage V1 allows the absolute value of the output voltage Vout to be adjusted. The adjustment of the absolute value of the output voltage Vout enables the yaw-rate signal to be corrected over the total usable temperature range of the yaw-rate sensor 11.

That is, in the first embodiment, the first and second slope correction data correspond to the analog DC signal voltages V21 and V22, and the absolute correction data corresponds to the analog DC signal voltage V1. The first and second slope correction data, and the absolute correction data are previously determined on the basis of the temperature dependent characteristic of the sensor signal (sensor output voltage Vs) of the yaw rate sensor 11 with respect to the environmental temperature T, and they are previously stored on the memory 14, respectively.

Incidentally, the voltage V(19b), that is, the resistance R20 of the resistor 20, and the resistance R22 of the resistor 22 are also previously determined based on the temperature dependent characteristic of the sensor signal (sensor output voltage Vs) of the yaw rate sensor 11 with respect to the environmental temperature T.

Next, the operations of the sensor signal correcting apparatus 13 will be described hereinafter in accordance with FIGS. 1, and 2A–2C.

Figure 2A:
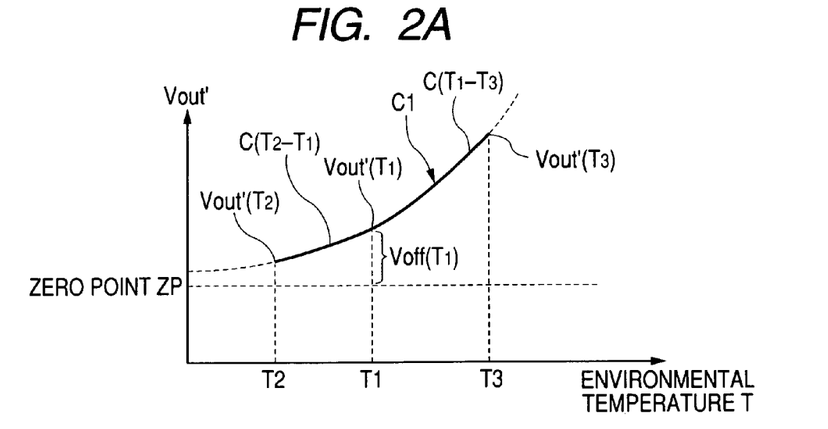
FIG. 2A is a graph representing a temperature dependent characteristic of the yaw rate sensor according to the first embodiment.

In the first embodiment, in order to show particularly the operations of the sensor signal correcting apparatus 13, the temperature dependent characteristic of the sensor signal (sensor output voltage Vs) with respect to the environmental temperature T is represented by solid line in FIG. 2A. In addition, the usable temperature range of the yaw rate sensor 11 is set to a range from a minimum temperature T2, such as −40° C. to a maximum temperature T3, such as +85° C., which is centered substantially at an ordinary temperature T1, such as 25° C.

For example, the yaw rate sensor 11 has the temperature dependent characteristic of the sensor signal (sensor output voltage Vs), which is prior to the correction of the sensor signal correcting apparatus 13, with respect to the environmental temperature T. In the temperature dependent characteristic of the yaw-rate signal which is prior to the correction of the sensor signal correcting apparatus 13, the output voltage Vout' that is identical with the sensor output voltage Vs nonlinearly increases in a second-order curve with the increase of the environmental temperature T, which is illustrated as a graph C1 in FIG. 2A.

The second-order curve within the temperature range from T2 to T1 is represented as C(T2–T1), and the second-order curve within the temperature range from T1 to T3 is represented as C(T1–T3).

As clearly shown in FIG. 2A, the output voltages Vout' of the yaw-rate sensor 11 have the offset voltages over the usable temperature range from T2 to T3 with respect to the zero point ZP. For example, the offset voltage of the output voltage Vout' at the ordinary temperature T1 with respect to the zero point ZP is represented as Voff (T1).

Figure 2B:
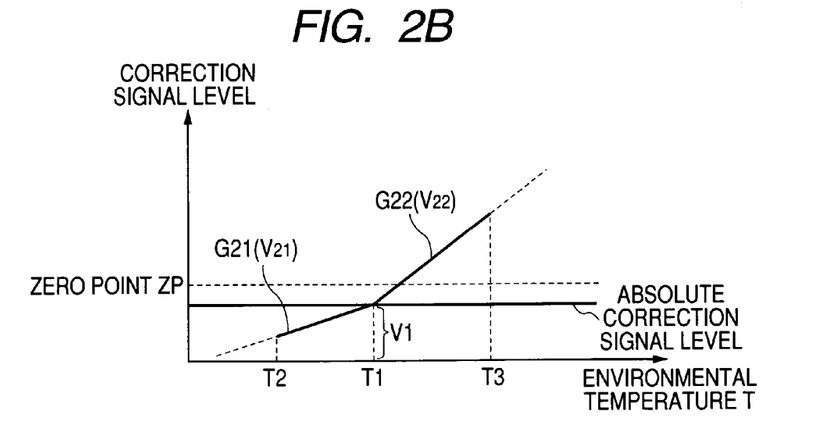
FIG. 2B is a graph illustrating first and second slope correction data, and absolute correction data stored on a memory as analog signals according to the first embodiment of the present invention.

FIG. 2B illustrates the first and second slope correction data, and the absolute correction data stored on the memory 14 as analog signal levels (voltages).

That is, the analog absolute correction signal level (voltage) based on the absolute correction data is set to a predetermined signal level (voltage), which corresponds to the analog DC signal voltage V1, over the total usable temperature range from T2 to T3. The analog absolute correction signal level corresponds to the absolute value of the offset voltage Voff (T1) at the ordinary temperature T1.

The first slope correction signal levels (voltages) based on the first slope correction data are set so that the locus of the first slope correction levels within the temperature range from T2 to T1 linearly increases to approximate to the secondary curve C(T2–T1) of the output voltages Vout' therewithin (see graph G21 in FIG. 2B).

Similarly, the second slope correction signal levels (voltages)-based on the second slope correction data are set so that the locus of the second slope correction signal levels within the temperature range from T1 to T3 linearly increases to approximate to the secondary curve C(T1–T3) of the output voltages Vout' therewithin. In particular, the slope of the linear locus shown in the graph G22 is higher than that of the linear locus shown in the graph G21 (see FIG. 2B).

The predetermined analog absolute correction signal level and the first slope correction signal level at the minimum temperature T2 are previously adjusted to allow the output voltage Vout' (T2) of the yaw-rate sensor 11 at the minimum temperature T1 corresponding to the offset voltage to be canceled.

Similarly, the predetermined analog absolute correction signal level, the first and second slope correction signal levels at the ordinary temperature T1 are previously adjusted to allow the output voltage Vout' (T1) of the yaw-rate sensor 11 at the ordinary temperature T1 corresponding to the offset voltage to be canceled.

Furthermore, the predetermined analog absolute correction signal level and the second slope correction signal level at the maximum temperature T3 are previously adjusted to allow the output voltage Vout' (T3) of the yaw-rate sensor 11 at the maximum temperature T3 corresponding to the offset voltage to be canceled.

In addition, in the first embodiment, the resistance R20 of the resistor 20 and the reference voltage Vref are set so that, when the environmental temperature T exceeds the ordinary temperature T1, the voltage V(19b) of the comparator's first input terminal exceeds the reference voltage Vref. The resistance R20 of the resistor 20 and the reference voltage Vref are also set so that, when the environmental temperature T does not exceed the ordinary temperature T1, the voltage V(19b) of the first input terminal of the comparator 19 does not exceed the reference voltage Vref.

In the sensor signal correcting apparatus 13 whose absolute correction data and first and second slope correction data are previously set and stored on the memory 14 as described above, under zero yaw rate of the vehicle being sensed by the yaw rate sensor 11, the sensor signal due to the temperature offset component is outputted from the yaw rate sensor 11 to the sensor signal amplifier 12. The sensor signal is amplified by the sensor signal amplifier 12, and the amplified sensor signal, such as sensor output voltage Vs, is supplied to the adder 17.

On the other hand, the output peripheral circuit 15 reads out the absolute correction data, the first and second slope correction data from the memory 14 to output them, respectively. The outputted absolute correction data is converted by the D/A converter 16a into, as the absolute correction voltage, the analog DC signal voltage V1. The outputted first and second slope correction data are converted by the D/A converters 16b and 16c into, as the first and second slope correction voltages, the analog DC signal voltages V21 and V22, respectively.

The converted analog DC signal voltage V1 is supplied to the adder 17.

In parallel to the above operations, the environmental temperature T around the yaw rate sensor 11 is sensed as the resistance Rt of the temperature sensitive sensor 21.

When the environmental temperature T exceeds the ordinary temperature T1, the voltage V(19b) of the first input terminal of the comparator 19 exceeds the reference voltage Vref, the high voltage signal is outputted from the comparator 19 through the output terminal 19a to the selection terminal 18d. This results in that the movable contact 18c of the switch 18 is switched to connect to the fixed contact 18b thereof.

The analog DC signal voltage V22 (the second slope correction voltage), therefore, is outputted through the movable contact 18c to the adder 17 as the analog DC signal voltage V2. On the other hand, the analog DC signal voltage V22 is also outputted through the movable contact 18c to the inverting amplifying circuit 25 to be amplified thereby, so that the amplified analog DC signal voltage V3 is outputted to the adder 17.

As described above, the adder 17 performs the arithmetic operations including the adding and subtracting operations based on the sensor output voltage Vs, the analog DC signal voltage V1, and the analog DC signal voltage V2 in accordance with the equation 5. These arithmetic operations allow the sensor voltage Vout' within the temperature range from T1 to T3, which is shown by the second order curve C(T1–T3) in FIG. 2A, to be corrected on the basis of the absolute correction voltage V1 and the second slope correction voltage V22.

On the other hand, when the environmental temperature T is not more than the ordinary temperature T1, the voltage V(19b) of the first input terminal of the comparator 19 does not exceed the reference voltage Vref, the low voltage signal is outputted from the comparator 19 through the output terminal 19a to the selection terminal 18d. This results in that the movable contact 18c of the switch 18 is switched to connect to the fixed contact 18a thereof.

The analog DC signal voltage V21 (the first slope correction voltage), therefore, is outputted through the movable contact 18c to the adder 17 as the analog DC signal voltage V2. On the other hand, the analog DC signal voltage V21 is also outputted through the movable contact 18c to the inverting amplifying circuit 25 to be amplified thereby, so that the analog DC signal voltage V3 is outputted to the adder 17.

As described above, the adder 17 performs the arithmetic operations including the adding and subtracting operations based on the sensor output voltage Vs, the analog DC signal voltage V1, and the analog DC signal voltage V2 in accordance with the equation 5. These arithmetic operations allow the sensor voltage Vout' within the temperature range from T2 to T1, which is shown by the second order curve C(T2–T1) in FIG. 2A, to be corrected on the basis of the absolute correction voltage V1 and the first slope correction voltage V21.

Concretely, the absolute correction voltages V1, V21, and V22 allow the offset voltage Vout' (T2) at the minimum temperature T2, the offset voltage Vout' (T1) at the ordinary temperature T1, and the maximum voltage Vout' (T3) at the maximum temperature T3 to be canceled.

Moreover, the variation of the analog DC signal voltage V21 within the temperature range from T2 to T1 approximates to the temperature dependent characteristic curve C(T2–T1) of the output voltage Vout'.

Furthermore, the variation of the analog DC signal voltage V22 within the temperature range from T1 to T3 approximates to the temperature dependent characteristic curve C(T1–T3) of the output voltage Vout'.

Figure 2C:
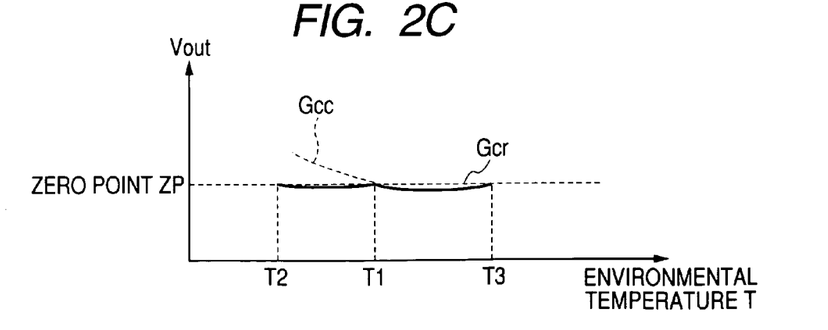
FIG. 2C is a graph illustrating a temperature dependent characteristic of the output voltage according to the first embodiment.

These features permit the temperature dependent characteristic of the output voltages Vout within the usable temperature range from T2 to T3, which are corrected by the adder 17 and outputted therefrom, to linearly approximate to the ideal zero point ZP, as shown by the graph Gcr of FIG. 2C.

In FIG. 2C, another temperature dependent characteristic of another output voltages within the usable temperature range from T2 to T3, which are simply linearly corrected on the basis of the only absolute correction voltage V1 and the second slope correction voltage V22 and outputted therefrom, are shown by the graph Gcc.

FIG. 2C clearly shows that the temperature dependent characteristic Gcr of the output voltages Vout approximates more to the zero point within the temperature range from T2 to T1 as compared with the temperature dependent characteristic Gcc, thereby effectively correcting the temperature dependent characteristic Gcr of the output voltages Vout.

While the sensor signal outputted from the yaw sensor 11 under zero yaw rate being sensed thereby is corrected by the sensor signal correcting apparatus 13 as described above, the yaw rate of the vehicle is actually sensed by the yaw rate sensor 11 as the sensor signal. Because the temperature dependent characteristic of the sensor signal is corrected by the sensor signal correcting apparatus 13 to be outputted as the output voltage Vout, it is possible to measure the yaw rate of the vehicle based on the output voltage Vout.

As described above, according to the first embodiment of the present invention, the temperature sensitive resistors 21 and 23 sense the environmental temperature T around the yaw rate sensor 11. The output peripheral circuit 15 and the D/A converters 16a–16c generate the absolute correction voltage V1, the first slope correction voltage V21, and the second slope correction voltage V22 based on the temperature dependent characteristic of the sensor signal of the yaw rate sensor 11 with respect to the environmental temperature T.

In particular, as shown in FIG. 2A, the temperature dependent characteristic C1 of the yaw rate sensor 11 with respect to the environmental temperature T has the first curve C(T2–T1) within the temperature range from T2 to T1. Similarly, the temperature dependent characteristic C1 of the yaw rate sensor 11 with respect to the environmental temperature T has the second curve C(T1–T3) within the temperature range from T1 to T3 so that the first and second curves are different from each other.

Then, in the first embodiment of the present invention, the first slope correction signal levels based on the first slope correction data are set so that the locus of the first slope correction voltages V21 within the temperature range from T2 to T1 approximates to the secondary curve C(T2–T1) therewithin. In addition, the second slope correction voltages V22 based on the second slope correction data are set so that the locus of the second slope correction signal levels within the temperature range from T1 to T3 approximates to the secondary curve C(T1–T3) therewithin.

That is, when the environmental temperature T is within the temperature range from T2 to T1, the first slope correction voltage V21, which approximates to the temperature dependent characteristic of the yaw rate sensor 11 with respect to the corresponding temperature range from T2 to T1, is automatically selected, so that the output voltage Vout is effectively corrected based on the first slope correction voltages V21.

Similarly, when the environmental temperature T is within the temperature range from T1 to T3, the second slope correction voltage V22, which approximates to the temperature dependent characteristic of the yaw rate sensor 11 with respect to the corresponding temperature range from T1 to T3, is automatically selected, so that the output voltage Vout is corrected based on the second slope correction voltages V22.

The above structure, therefore, allows the temperature dependent characteristic of the output voltage Vs of the yaw rate sensor 11 to be effectively corrected without using a microcomputer and performing analog-to-digital converting (quantizing) process of the sensor signal and digital-to-analog converting process thereof.

This makes it possible for the sensor signal correcting apparatus 13 to perform the correction of the output voltage Vout in the environmental temperature T in extremely short time without generating quantization errors, while preventing the cost of the apparatus 13 from increasing.

(Second Embodiment)

Next, a sensor signal correcting apparatus 30 according to a second embodiment of the present invention will be explained hereinafter.

Incidentally, elements of the sensor signal correcting apparatus 30 according to the second embodiment, which are substantially identical with those of the sensor signal correcting apparatus 13 according to the first embodiment, are assigned to the same reference characteristics of the sensor signal correcting apparatus 13 shown in FIG. 1, and explanations thereabout are omitted or simplified.

Figure 3:
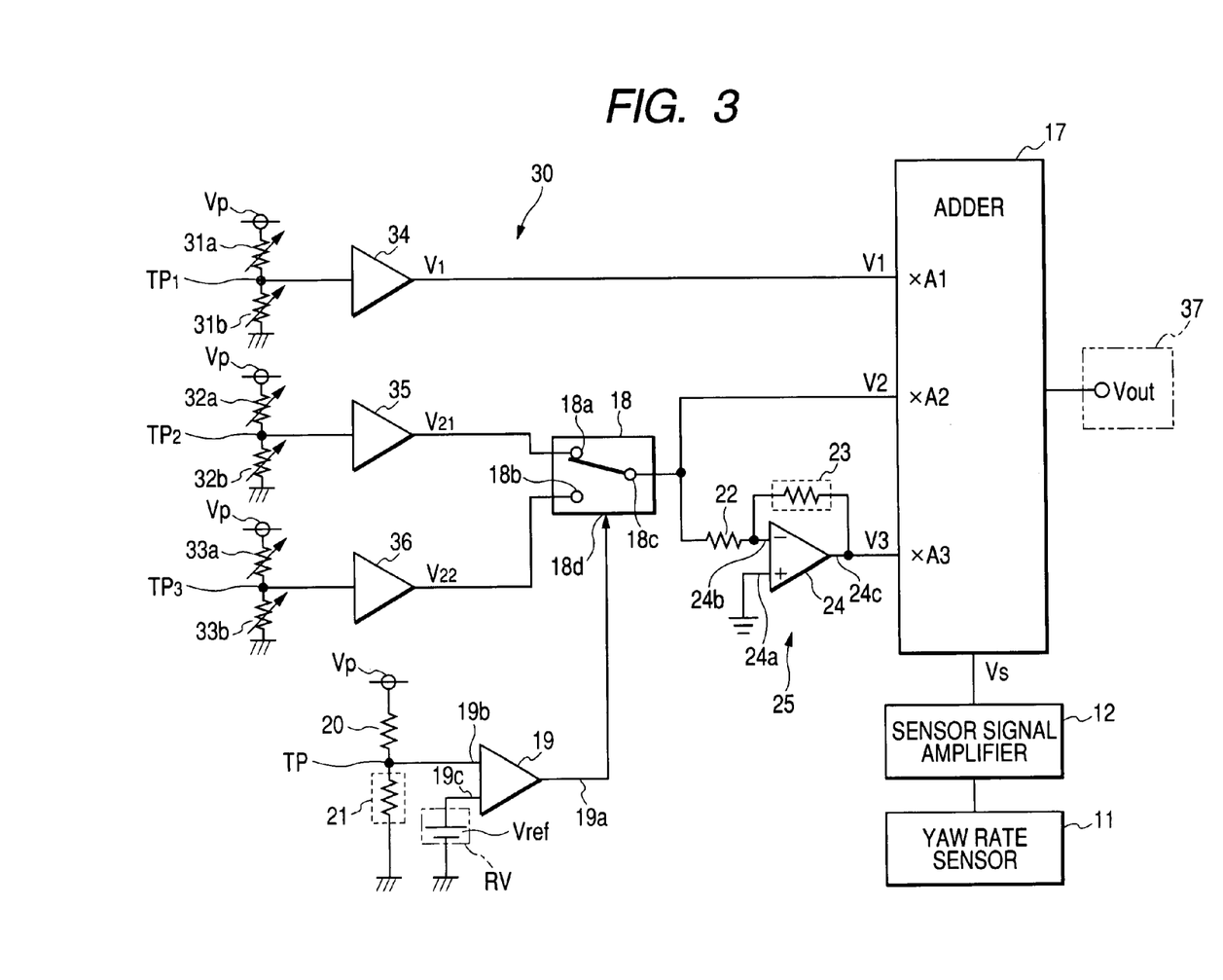
FIG. 3 is a block diagram schematically illustrating the yaw rate sensor, the sensor signal amplifier, and a sensor signal correcting apparatus according to a second embodiment of the present invention.

FIG. 3 is a block diagram schematically illustrating the yaw rate sensor 11, the sensor signal amplifier 12, and the sensor signal correcting apparatus 30 according to the second embodiment.

The sensor signal correcting apparatus 30 is composed of, in place of the memory 14 and output peripheral circuit 15, a plurality of, such as three pair of variable resistors 31a, 31b, 32a, 32b, and 33a, 33b.

The paired variable resistors 31a and 31b are electrically connected to each other in series through a tap terminal TP1, and the paired variable resistors 32a and 32b are electrically connected to each other in series through a tap terminal TP2. Similarly, the paired variable resistors 33a and 33b are electrically connected to each other in series through a tap terminal TP3.

To one end of each of the variable resistors 31a–33a opposite to each of the variable resistors 31b–33b, the power supply voltage Vp is supplied.

The variable resistors 31a–33a and 31b–33b are so configured that their variable resistors are manually adjustable, respectively.

The sensor signal correcting apparatus 30 is further composed of a plurality of, such as three buffers 34, 35, and 36, which are electrically connected to the tap terminals TP1, TP2, and TP3, respectively.

The buffer 34 is electrically connected to the adder 17 and configured to minimize the interaction between the paired variable resistors 31a, 31b and the adder 17. The buffers 35 and 36 are electrically connected to the fixed contacts 18a and 18b of the switch 18, respectively. The buffer 35 is configured to minimize the interaction between the paired variable resistors 32a, 32b and the switch 18, and the buffer 36 is configured to minimize the interaction between the paired variable resistors 33a, 33b and the switch 18.

The sensor signal correcting apparatus 30 is composed of a monitor 37 for monitoring the output voltage Vout.

In the second embodiment, a manufacturer manually adjusts the variable resistances R31a and R31b of the resistors 31a and 31b so that the power supply voltage Vp is divided based on the variable resistances R31a and R31b, whereby the analog DC signal voltage V1 is outputted through the buffer 34.

Similarly, the manufacturer manually adjusts the variable resistances R32a and R32b of the resistors 32a and 32b so that the power supply voltage Vp is divided based on the variable resistances R32a and R32b, whereby the analog DC signal voltage V21 is outputted through the buffer 35. In addition, the manufacturer manually adjusts the variable resistances R33a and R33b of the resistors 33a and 33b so that the power supply voltage Vp is divided based on the variable resistances R33a and R33b, whereby the analog DC signal voltage V22 is outputted through the buffer 36.

Other structure and operations of the second embodiment are identical with those of the first embodiment.

According to the second embodiment, when manufacturing products, such as vehicles in which the yaw rate sensors 11 and the sensor signal correcting apparatuses 30 are installed in production lines or the like, even if the sensor signal correcting apparatuses 30 are required to be individually adjusted, it is possible for the manufacturer to manually individually adjust the sensor signal correcting apparatuses 30 while monitoring their output voltages Vout on the monitor 37.

In the second embodiment, the manufacturer manually adjusts the variable resistances of the resistors 31a–33a and 31b–33b to set the absolute correction voltage V1, and the first and second slope correction voltages V21, and V22, respectively.

In the second embodiment, to more simplify manual adjustments of the absolute correction signal level, and the first and second slope correction signal levels is preferable. Then, in a modification of each of the first and second embodiments, the resistances Rt of the temperature sensitive resistors 21 and 23, the resistance R22 of the resistor 22, and the second and third gains A2 and A3 of the adder 17 are set so that they have predetermined dependencies thereamong.

This setting of the above parameters allow the absolute correction signal level, and the first and second slope correction signal levels to be individually adjusted.

As an example of the predetermined dependencies of the above parameters, making zero the voltage V2's coefficient of the second term in the equation 5 is desirable. That is, the second and third gains A2 and A3, the resistance Rt of the temperature sensitive resistor R23, and the resistance R22 of the resistor 22 have the dependency represented by the following equation 6:

$$A2 = A3 \times Rt/R22 \qquad \text{[Equation 6]}$$

This equation 6 corresponds to an example of a condition so that a result of the first arithmetic operation is zero at a threshold temperature Tz according to the present invention.

That is, in the modification of the second embodiment, similarly to the first embodiment, the resistance R20 of the resistor 20 and the reference voltage Vref are set so that, when the environmental temperature T exceeds the predetermined threshold voltage Vz, the voltage V(19b) of the comparator's first input terminal exceeds the reference voltage Vref. This causes the analog DC signal voltage V22 (the second slope correction voltage) to be selected by the switch 18 so that the analog DC signal voltage V22 is outputted to the adder 17 as the analog DC signal voltage V2.

On the other hand, when the environmental temperature T does not exceed the predetermined threshold voltage Vz, the voltage V(19b) of the first input terminal of the comparator 19 does not exceed the reference voltage Vref. This causes the analog DC signal voltage V21 (the first slope correction voltage) to be selected by the switch 18 so that the analog DC signal voltage V21 is outputted to the adder 17 as the analog DC signal voltage V2.

In addition, the second and third gains A2 and A3, the resistance Rt of the temperature sensitive resistor R23, and the resistance R22 of the resistor 22 are set to satisfy the relationship represented by the equation 6 on the basis of the characteristics of the temperature sensitive resistors R21 and R23. Setting the threshold temperature Tz to the ordinary temperature T1, as well as the first embodiment, is more preferable because the manufacturer can adjust the resistances R31a–R33a and R31b–R33b of the variable resistors 31a–33a and 31b–33b at the ordinary temperature T1.

In a case of carrying out the sensor signal correction operations when the environmental temperature T equals to the threshold temperature Tz, the third term of the equation 5 is made zero. The manufacturer, therefore, adjusts the resistances R31a and R31b of the variable resistors 31a and 31b to adjust the absolute correction voltage V1, which allows the absolute correction signal level to be adjusted with the first and second slope correction signal levels kept constant.

After the environmental temperature T increases up to the maximum temperature T3, the manufacturer adjusts the resistances R33a and R33b of the variable resistors 33a and 33b to adjust the second slope correction voltage V22, making it possible to adjust the second slope correction signal level, which corresponds to the high temperature side in the usable temperature range, with the absolute correction signal level kept constant.

Similarly, after the environmental temperature T decreases up to the minimum temperature T1, the manufacturer adjusts the resistances R32a and R32b of the variable resistors 32a and 32b to adjust the first slope correction voltage V21, making it possible to adjust the first slope correction signal level, which corresponds to the low temperature side in the usable temperature range, with the absolute correction signal level kept constant.

As described above, in the modification, it is possible to individually adjust the parameters including the absolute correction signal level, and the first and the second slope correction signal levels, respectively, thereby simply and immediately adjusting the parameters, respectively.

That is, the second and third gains A2 and A3, the resistance Rt of the temperature sensitive resistor R23, and the resistance R22 of the resistor 22 are set to satisfy the relationship represented by the equation 6. This allows one of the parameters that include the absolute correction signal level and the first and the second slope correction signal levels to be adjusted independently from other parameters, making it possible to simply immediately adjust the parameters, respectively.

Incidentally, the present invention is not limited to the above embodiments and modifications.

That is, in the first embodiment, as the memory 14, an EEPROM having the storage capacity 30 to 100 bits may be applied. In this structure, electrically rewriting the absolute correction data, the first slope correction data, and the second slope correction data allows the absolute correction voltage, and the first and the second slope correction voltages to be externally adjusted.

In the first and second embodiments and modifications, the yaw rate sensor 11 has the temperature dependent characteristic shown in FIG. 2A, but the yaw rate sensor 11 may have any temperature dependent characteristics, preferably, the temperature dependent characteristic that nonlinearly varies.

The present invention may be applied to any dynamic volume sensors except for temperature sensors. For example, as the dynamic volume sensors used in a vehicle, G sensors (acceleration sensors) used for controlling airbags and/or brakes, and pressure sensors used for measuring intake pressure and/or brake hydraulic pressure are representative. In addition, as the dynamic volume sensors to which the present invention is applied in terms of materials, semiconductor sensors and ceramic sensors are representative.

Figure 4:
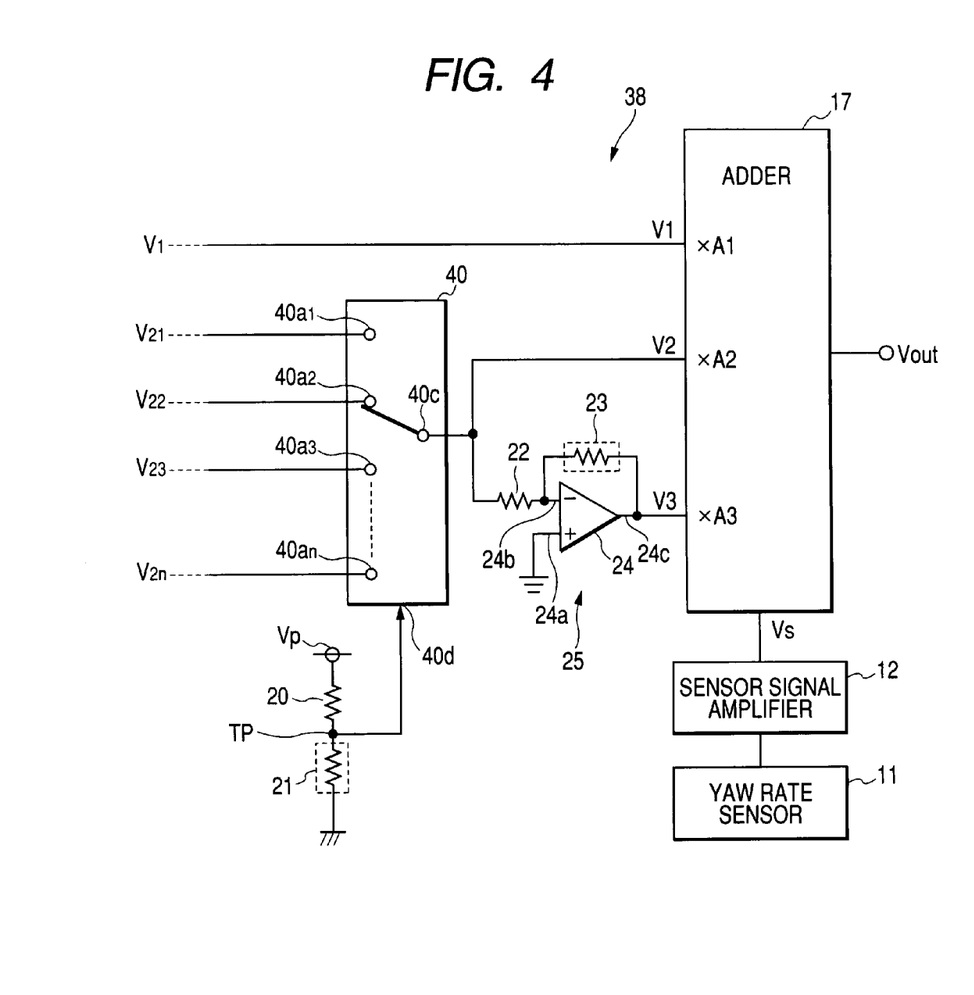
FIG. 4 is a block diagram schematically illustrating the yaw rate sensor, the sensor signal amplifier, and a sensor signal correcting apparatus according to another modification of the first and second embodiments of the present invention.

In addition, FIG. 4 is a block diagram schematically illustrating the yaw rate sensor 11, the sensor signal amplifier 12, and a sensor signal correcting apparatus 38 according to another modification of the first and second embodiments.

That is, the sensor signal correcting circuit 38 is composed of, in place of the switch 18, a multiple-input switch 40, such as a multiplexer, which corresponds to an example of a switching unit according to the present invention.

That is, the multiple-input switch 40 is provides with a plurality of, such as n ($\geq 3$) fixed contacts 40a1, 40a2, ..., 40an, a movable contact 40c that is contactable with any one of the fixed contacts 40a1 to 40an, and a selection terminal 40d.

To the fixed contacts 40a1, 40a2, ..., 40an, a plurality of, such as n analog DC signal voltages V21, V22, ..., V2n are supplied, respectively. The n analog DC signal voltages V21, V22, ..., V2n are generated as well as the first embodiment or the second embodiment.

That is, the multiple-input switch 40 is configured to selectively switch the connection of the movable contact 40c to any one of the fixed contacts 40a1, ..., 40an in response to a voltage inputted to the selection terminal 40d. For example, the connection of the movable contact 40c with the fixed contact 40a1 allows the analog DC signal voltage V21 to be outputted through the movable contact 40c to the adder 17 and the inverting amplifying circuit 25. Moreover, the connection of the movable contact 40c with the fixed contact 40an allows the analog DC signal voltage V2n to be outputted through the movable contact 40c to the adder 17 and the inverting amplifying circuit 25.

In this modification, the comparator 19 is omitted so that the voltage V(TP) at the tap terminal TP is represented as the following equation 7:

$$V(TP) = Vp \times Rt/(R20+Rt) \quad \text{[Equation 7]}$$

The tap terminal TP is directly connected to the selection terminal 40d of the multi-input switch 40.

That is, assuming that usable temperature range of the yaw rate sensor 11 is set to the range from the minimum temperature Ta1 to the maximum temperature Tan, the resistance R20 of the resistor 20 is set so that, when the environmental temperature T is within the temperature range from T1a to T2a, the predetermined voltage V(TP) is inputted to the selection terminal 40d, whereby the movable contact 40c of the switch 40 is switched to connect to the fixed contact 40a1 thereof.

When the environmental temperature T is within the temperature range from T2a to T3a, the voltage V(TP) is inputted to the selection terminal 40d so that the movable contact 40c of the switch 40 is switched to connect to the fixed contact 40a2 thereof.

Similarly, when the environmental temperature T is within any one of the temperature range T3a–T4a, ..., the temperature range Tn–1a to Tna, the movable contact 40c of the switch 40 is switched to connect to one of the fixed contacts 40a3–40an, which corresponds to the one of the temperature ranges.

Figure 5A:
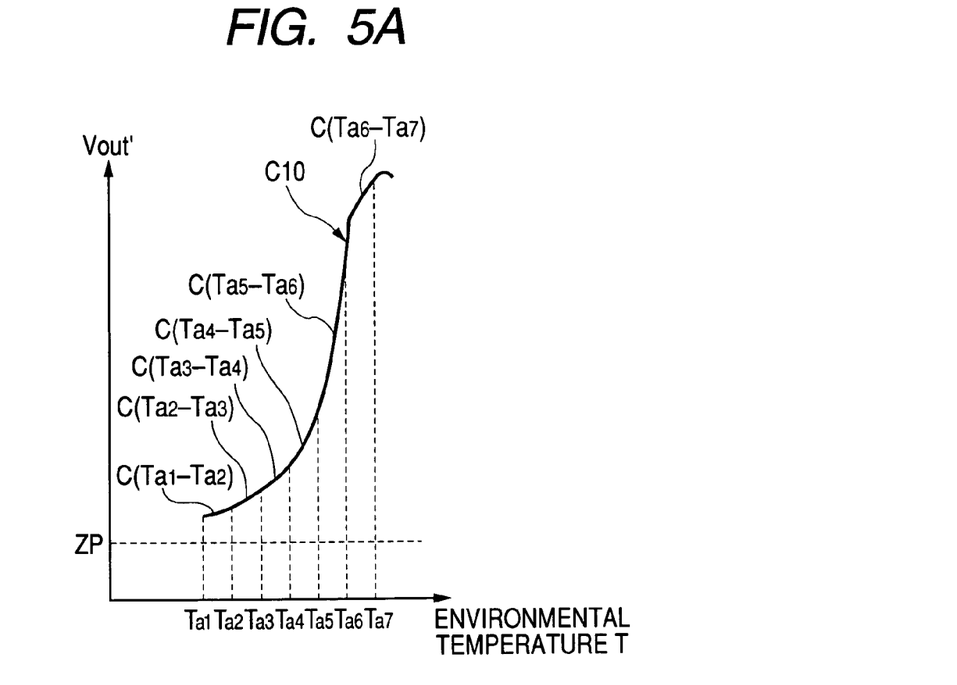
FIG. 5A is a graph representing a temperature dependent characteristic of the yaw rate sensor according to a modification of the first and second embodiments.

In this modification, similar to the first embodiment, the temperature dependent characteristic of the sensor signal (sensor output voltage Vs) with respect to the environmental temperature T is represented by solid line in FIG. 5A.

For example, the yaw rate sensor 11 has the temperature dependent characteristic of the sensor signal (sensor output voltage Vs), which is prior to the correction of the sensor signal correcting apparatus 38, with respect to the environmental temperature T. In the temperature dependent characteristic of the yaw-rate signal which is prior to the correction of the sensor signal correcting apparatus 38, the output voltage Vout' that is identical with the sensor output voltage Vs nonlinearly increases in a substantially second-order curve with the increase of the environmental temperature T, which is illustrated as a graph C10 in FIG. 5A.

The second-order curve within the temperature range from Ta1 to Ta2 is represented as C(Ta1–Ta2), that within the temperature range from Ta2 to Ta3 is represented as C(Ta2–Ta3), and that within the temperature range from Ta3 to Ta4 is represented as C(Ta3–Ta4).

Similarly, the second-order curve within the temperature range from Ta4 to Ta5 is represented as C(Ta4–Ta5), that within the temperature range from Ta5 to Ta6 is represented as C(Ta5–Ta6), and that within the temperature range from Ta6 to Ta7 is represented as C(Ta6–Ta7).

Figure 5B:
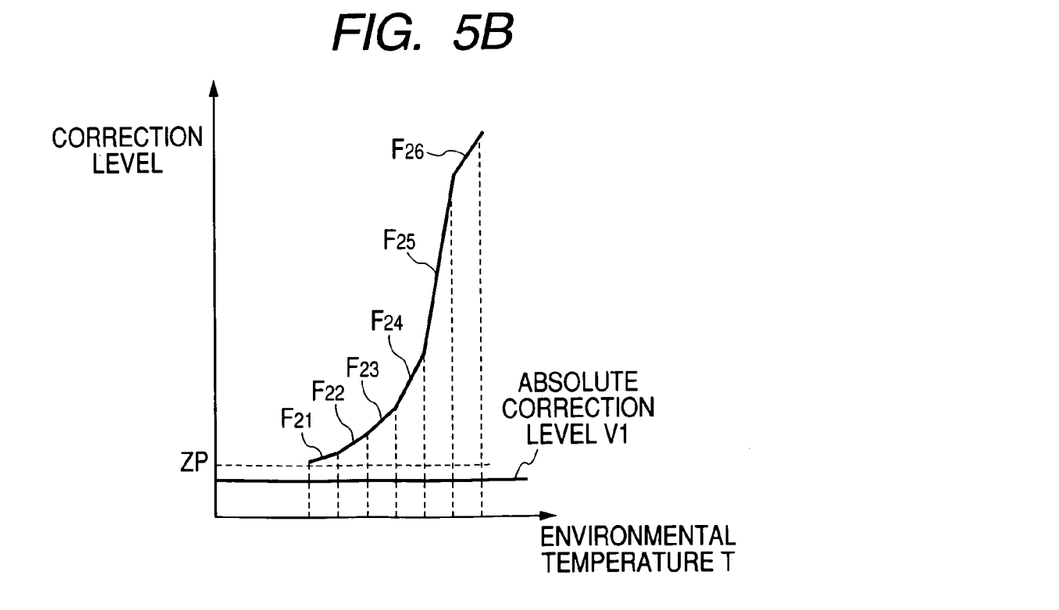
FIG. 5B is a graph illustrating first and second slope correction data, and absolute correction data stored on a memory as analog signals according to the modification of the first and second embodiments.

FIG. 5B illustrates the first to n-th, for example, sixth slope correction signal levels, and the absolute correction signal level V1.

That is, the first slope correction signal levels V21 are set so that the locus of the first slope correction signal levels within the temperature range from Ta1 to Ta2 linearly increases to approximate to the secondary curve C(Ta1–Ta2) of the output voltages Vout' therewithin (see graph F21 in FIG. 5B).

The second slope correction signal levels V22 are set so that the locus of the second slope correction signal levels within the temperature ranges from Ta2 to Ta3 linearly increase to approximate to the secondary curves C(Ta2–Ta3) (see graph F22 in FIG. 5B).

The remaining slope correction signal levels V23 to V2n are the same as the first and second slope correction signal levels (see graphs F23 to F26 in FIG. 5B).

That is, in the modification, for example, when the environmental temperature T is within the temperature range from Ta1 to Ta2, the first slope correction voltage V21, which approximates to the temperature dependent characteristic of the yaw rate sensor 11 with respect to the corresponding temperature range from Ta1 to Ta2, is automatically selected so that the output voltage Vout is effectively corrected based on the first slope correction voltages V21.

Figure 6:
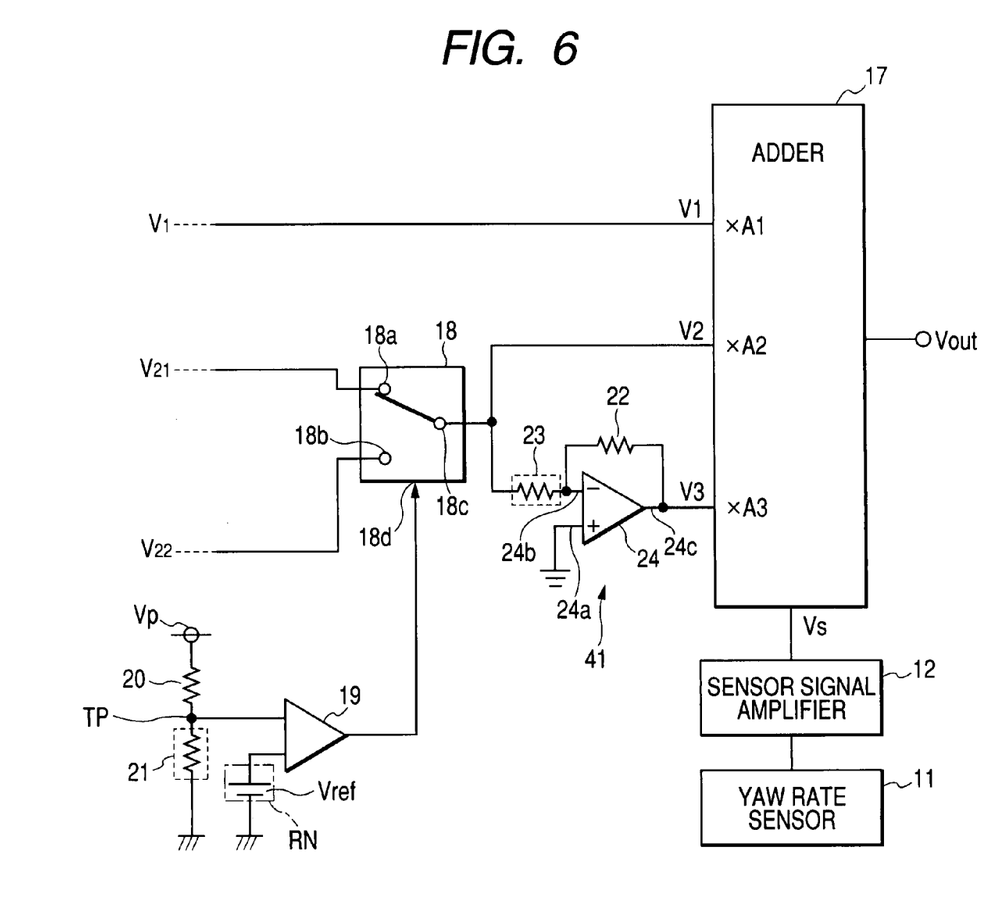
FIG. 6 is a block diagram schematically illustrating the yaw rate sensor, the sensor signal amplifier, and a sensor signal correcting apparatus according to another modification of the first and second embodiments of the present invention.

Therefore, as described in the first embodiment, the arithmetic operations of the adder 17 based on the sensor output voltage Vs, the analog DC signal voltage V1, and the analog DC signal voltage V2 (V21) in accordance with the equation 5 allow the sensor voltage Vout' within the temperature range from Ta1 to Ta2, which is shown by the second order curve C(Ta1–Ta2) in FIG. 6A, to be corrected on the basis of the absolute correction voltage V1 and the first slope correction voltage V21.

Similarly, for example, when the environmental temperature T is within the temperature range from Ta5 to Ta6, the fifth slope correction voltage V25, which approximates to the temperature dependent characteristic of the yaw rate sensor 11 with respect to the corresponding temperature range from Ta5 to Ta6, is automatically selected so that the output voltage Vout is corrected based on the fifth slope correction voltages V25.

The arithmetic operations of the adder 17 based on the sensor output voltage Vs, the analog DC signal voltage V1, and the analog DC signal voltage V2 (V25) in accordance with the equation 5 allow the sensor voltage Vout' within the temperature range from Ta5 to Ta6, which is shown by the second order curve C(Ta5–Ta6) in FIG. 6A, to be corrected on the basis of the absolute correction voltage V1 and the fifth slope correction voltage V25.

The above structure, therefore, allows the temperature dependent characteristic of the output voltage Vs of the yaw rate sensor 11 to be effectively corrected without using a microcomputer and performing analog-to-digital converting (quantizing) process of the sensor signal and digital-to-analog converting process thereof.

This makes it possible for the sensor signal correcting apparatus 13 to perform the correction of the output voltage Vout in the environmental temperature T in extremely short time without generating quantization errors, while preventing the cost of the apparatus 13 from increasing.

In addition, in the first and second embodiments and modifications, the inverting amplifying circuit 25 amplifies the analog DC signal voltage V2 to be proportional to the resistance Rt of the temperature sensitive resistor 23, the present invention is not limited to the structure.

That is, as shown in FIG. 6, the arrangement of resistor 22 and that of temperature sensitive resistor 23 may be changed, thereby providing an inverting amplifying circuit 41.

The inverting amplifying circuit 41 may amplify the analog DC signal voltage V2 to be inversely proportional to the resistance Rt of the temperature sensitive resistor 23.

While there has been described what is at present considered to be the embodiments and modifications of the invention, it will be understood that various modifications which are not described yet may be made therein, and it is intended to cover in the appended claims all such modifications as fall within the true spirit and scope of the invention.

This application is based upon and claims the benefit of priority of the prior Japanese Patent Application 2003-073899 filed on Mar. 18, 2003 so that the contents of which are incorporated herein by reference.

What is claimed is:

1. An apparatus for sensing an environmental temperature around a sensor as a temperature parameter signal and correcting a sensor signal outputted from the sensor based on the temperature parameter signal, said sensor having a usable temperature range, said temperature parameter signal depending on the environmental temperature, said sensor signal having a predetermined temperature dependent characteristic that varies within the usable temperature range depending on a variation of the environmental temperature, said apparatus comprising:

a slope correction signal setting unit configured to output selectively one of a plurality of direct current signals according to the sensed temperature parameter signal, voltage levels of said plurality of direct current signals being determined to correspond to the predetermined temperature dependent characteristic of the sensor signal;

an absolute correction signal setting unit configured to set an absolute direct current signal for correcting the predetermined temperature dependent characteristic over the usable temperature range;

an analog amplifying circuit connected to the slope correction signal setting unit and configured to amplify the outputted direct current signal according to the sensed temperature parameter signal; and an analog arithmetic circuit connected to the analog amplifying circuit and configured to carry out a predetermined arithmetic operation based on the outputted direct current signal from the slope correction signal setting unit, the absolute direct current signal, the amplified direct current signal and the sensor signal.

2. An apparatus according to claim 1, wherein said plurality of direct current signals are set within the usable temperature range so that loci of the voltage levels of the direct current signals within the usable temperature range approximate to the predetermined temperature dependent characteristic, respectively.

3. An apparatus according to claim 1, wherein said slope correction signal setting unit includes:

a memory on which digital correction data corresponding to the direct current signals is stored;

a digital-to-analog converting unit configured to convert the digital correction data into the direct current signals; and a switch unit connected to the digital-to-analog converting unit and configured to output selectively one of the plurality of direct current signals according to the sensed temperature parameter signal.

4. An apparatus according to claim 1, wherein said slope correction signal setting unit is configured so that the voltage levels of the plurality of the direct current signals are externally adjustable, respectively.

5. An apparatus according to claim 1, wherein said absolute correction signal setting unit is configured so that a voltage level of the absolute direct current signal is externally adjustable.

6. An apparatus according to claim 1, wherein said predetermined arithmetic operation includes first and second predetermined arithmetic operations, arid said analog arithmetic circuit is connected to the absolute correction signal setting unit and configured to:

carry out the first predetermined arithmetic operation based on the amplified direct current signal; and carry out the second predetermined arithmetic operation based on a result of the first predetermined arithmetic operation, the absolute direct current signal, and the sensor signal, said result of the first arithmetic operation being made zero at a predetermined threshold temperature, said slope correction signal setting unit being configured to output selectively one of the plurality of direct current signals when the environmental temperature exceeds the predetermined threshold temperature, and another one thereof when the environmental temperature does not exceed the predetermined threshold temperature.

7. An apparatus for sensing an environmental temperature around a yaw rate sensor as a temperature parameter signal and correcting a sensor signal outputted from the yaw rate sensor based on the temperature parameter signal, said yaw rate sensor having a usable temperature range, said temperature parameter signal depending on the environmental temperature, said sensor signal having a predetermined temperature dependent characteristic that varies within the usable temperature range depending on a variation of the environmental temperature, said apparatus comprising:

a slope correction signal setting unit configured to output selectively one of a plurality of direct current signals according to the sensed temperature parameter signal, voltage levels of said plurality of direct current signals being determined to correspond to the predetermined temperature dependent characteristic of the sensor signal;

an absolute correction signal setting unit configured to set an absolute direct current signal for correcting the predetermined temperature dependent characteristic over the usable temperature range;

an analog amplifying circuit connected to the slope correction signal setting unit and configured to amplify the outputted direct current signal according to the sensed temperature parameter signal; and an analog arithmetic circuit connected to the analog amplifying circuit and configured to carry out a predetermined arithmetic operation based on the outputted direct current signal from the slope correction signal setting unit, the absolute direct current signal, the amplified direct current signal and the sensor signal.

8. An apparatus according to claim 7, wherein said plurality of direct current signals are set within the usable temperature range so that loci of the voltage levels of the direct current signals within the usable temperature range approximate to the predetermined temperature dependent characteristic, respectively.

9. An apparatus according to claim 7, wherein said slope correction signal setting unit includes:

a memory on which digital correction data corresponding to the direct current signals is stored;

a digital-to-analog converting unit configured to convert the digital correction data into the direct current signals; and a switch unit connected to the digital-to-analog converting unit and configured to output selectively one of the plurality of direct current signals according to the sensed temperature parameter signal.

10. An apparatus according to claim 7, wherein said slope correction signal setting unit is configured so that the voltage levels of the plurality of the direct current signals are externally adjustable, respectively.

11. An apparatus according to claim 7, wherein said an absolute correction signal setting unit is configured so that a voltage level of the absolute direct current signal is externally adjustable.

12. An apparatus according to claim 7, wherein said predetermined arithmetic operation includes first and second predetermined arithmetic operations, and said analog arithmetic circuit is connected to the absolute correction signal setting unit and configured to:

carry out the first predetermined arithmetic operation based on the amplified direct current signal; and carry out the second predetermined arithmetic operation based on a result of the first predetermined arithmetic operation, the absolute direct current signal, and the sensor signal, said result of the first arithmetic operation being made zero at a predetermined threshold temperature, said slope correction signal setting unit being configured to output selectively one of the plurality of direct current signals when the environmental temperature exceeds the predetermined threshold temperature, and another one thereof when the environmental temperature does not exceed the predetermined threshold temperature.

13. A method of correcting a sensor signal outputted from a sensor having a usable temperature range, said method comprising:

sensing an environmental temperature around the sensor as a temperature parameter signal, said temperature parameter signal depending on the environmental temperature, said sensor signal having a predetermined temperature dependent characteristic that varies within the usable temperature range depending on a variation of the environmental temperature;

outputting selectively one of a plurality of direct current signals according to the sensed temperature parameter signal, voltage levels of said plurality of direct current signals being determined to correspond to the predetermined temperature dependent characteristic of the sensor signal;

setting an absolute direct current signal for correcting the predetermined temperature dependent characteristic over the usable temperature range;

amplifying the outputted direct current signal according to the sensed temperature parameter signal; and carrying out a predetermined arithmetic operation based on the outputted direct current signal from the slope correction signal setting step, the absolute direct current signal, the amplified direct current signal and the sensor signal.

* * * * *